United States Patent
DeAgro

(10) Patent No.: US 7,265,710 B2
(45) Date of Patent: Sep. 4, 2007

(54) MULTIPATH HEIGHT FINDING METHOD

(75) Inventor: William C. DeAgro, Shirley, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 277 days.

(21) Appl. No.: 10/988,009

(22) Filed: Nov. 12, 2004

(65) Prior Publication Data

US 2006/0103572 A1    May 18, 2006

(51) Int. Cl.
*G01S 13/08* (2006.01)
(52) U.S. Cl. .................. 342/120; 342/123
(58) Field of Classification Search ........... 342/118, 342/120–123, 38, 125–126; 701/4
See application file for complete search history.

(56) References Cited

U.S. PATENT DOCUMENTS

| | | | | |
|---|---|---|---|---|
| 2,134,535 A * | 10/1938 | Runge | ................ | 342/458 |
| 3,229,283 A * | 1/1966 | Hefter et al. | ................ | 342/421 |
| 3,721,986 A * | 3/1973 | Kramer | ................ | 342/453 |
| 3,939,476 A * | 2/1976 | Leopard et al. | ................ | 342/464 |
| 4,369,444 A * | 1/1983 | Blumling | ................ | 342/104 |
| 4,370,656 A * | 1/1983 | Frazier et al. | ................ | 342/458 |
| 4,584,584 A * | 4/1986 | Kliger | ................ | 342/451 |
| 4,595,925 A * | 6/1986 | Hansen | ................ | 342/123 |
| 4,828,382 A * | 5/1989 | Vermilion | ................ | 356/4.01 |
| 5,278,564 A * | 1/1994 | Groenenboom | ................ | 342/123 |
| 5,546,087 A * | 8/1996 | Martin Neira | ................ | 342/120 |
| 5,608,407 A * | 3/1997 | Jain et al. | ................ | 342/126 |
| 5,614,912 A * | 3/1997 | Mitchell | ................ | 342/146 |
| 5,703,594 A * | 12/1997 | Anderson | ................ | 342/123 |
| 5,825,324 A * | 10/1998 | Julian | ................ | 342/118 |
| 6,256,559 B1* | 7/2001 | Tsui | ................ | 701/4 |
| 6,414,745 B1* | 7/2002 | Moriya | ................ | 356/3.11 |

\* cited by examiner

*Primary Examiner*—Thomas H. Tarcza
*Assistant Examiner*—Shelley Chen
(74) *Attorney, Agent, or Firm*—Robert P. Lenart, Esq.; Pietragallo Bosick & Gordon, LLP

(57) ABSTRACT

A method for determining the height $H_T$ of a target above a surface, the method comprising the steps of determining a distance R from a source to a target, determining a distance L representative of a distance traveled by a signal from the target that is reflected by the surface to the source, determining a height H of the source above the surface, and determining the height $H_T$ of the target using the equation:

$$H_T = \frac{(L^2 - R^2)}{4H}$$

Associated target height errors that result from input errors can also be determined using the equation.

9 Claims, 2 Drawing Sheets

MULTIPATH HEIGHT FINDING METHOD

FIELD OF THE INVENTION

This invention relates to methods for determining the height of an object, and more particularly to methods for determining the height of a target using a multipath signal.

BACKGROUND OF THE INVENTION

Radar can be used to determine the range of a target from a radar set that may be mounted on an aircraft. A narrow radar beam can be scanned in azimuth and/or elevation to determine the azimuth and elevation of a target. The narrow beam needed for good resolution at long distances requires a large antenna. In addition, since aircraft radars are not fixed with respect to the ground, a target elevation measured from an aircraft does not provide a direct determination of the height of the target.

There is a need for a method for determining the height of a target using parameters available at an aircraft.

SUMMARY OF THE INVENTION

The invention provides a method for determining the height $H_T$ of a target above a surface. The method comprises the steps of determining a distance R from a source to a target, determining a distance L representative of a distance traveled by a signal from the target that is reflected by the surface to the source, determining a height H of the source above the surface, and determining the height $H_T$ of the target using the equation:

$$H_T = \frac{(L^2 - R^2)}{4H}$$

In another aspect, the invention further encompasses the steps of:
(a) determining a parameter $\alpha$ using the formula $$a = \frac{\sqrt{R^2 - (H_T - H_P)^2}}{1 + \frac{H_T}{H_P}},$$

wherein $H_P$ is initially set equal to H;
(b) updating the parameter $H_P$ using the formula $$H_P = \sqrt{(Re+H)^2 - a^2} - Re,$$

wherein Re is the radius of a sphere;
(c) recomputing $H_T$ using the updated value of $H_P$ as H;
(d) repeating step (a) using the updated parameter $H_P$ and $H_T$;
(e) repeating step (b); and
(f) determining a height of the target using the formula $$HTR = -Re + \sqrt{(Re + H_T)^2 + a^2 \left[\frac{H_T}{H_P}\right]^2}.$$

The invention also encompasses an apparatus comprising a radar transmitter for emitting radiation and located at an altitude H above a reflecting surface, a radar receiver for detecting the radiation reflected from a target located at an altitude $H_T$ above the reflecting surface, and a processor for calculating the target altitude $H_T$ from the relationship $$H_T = \frac{(L^2 - R^2)}{4H};$$

wherein L is a path length of the radiation reflected from the target and the reflecting surface to the receiver, and R is a range between the radar transmitter and the target. L is also the path length of the radiation transmitted by the transmitter to the reflecting surface and to the target.

DETAILED DESCRIPTION OF THE INVENTION

This invention relates to methods and apparatus for finding the height of a target using multipath information. In one embodiment of the invention, a flat earth type model is used. In a second embodiment, a spherical model is used.

Figure 1:
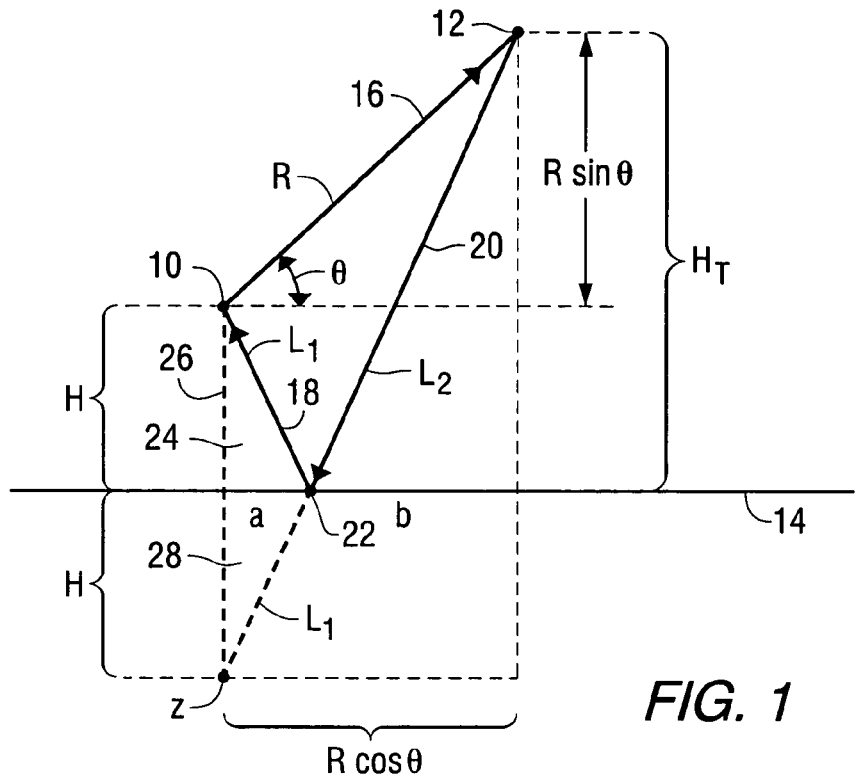
FIG. 1 is a diagram of an aircraft and target system that illustrates the method of the invention.

The geometry for the embodiment of the flat earth height finding model is shown in FIG. 1. In FIG. 1, a first aircraft is located at point 10. A target, which can be a second aircraft, is located at point 12. The first aircraft is located at a height H above a flat surface 14. The method seeks to determine the height $H_T$ of the target above the flat surface 14. Vector 16 has a magnitude R, which represents the distance (range) from point 10 to point 12. In a practical implementation of the invention, this distance could be determined using a radar in the first aircraft. Angle θ is the angle between the vector 16 and the flat surface 14. Vectors 18 and 20 represent the path of a multipath signal, which may be a radar return signal from the target. Vectors 18 and 20 have lengths $L_1$ and $L_2$. Point 22 is the point at which the flat surface reflects the return signal. This point is referred to as the ground bounce inflection point of the multipath signal.

The closed form solution for the target height $H_T$ is derived as follows. The distance traveled by the return signal, also called the total ground bounce length, L is defined as:

$$L = L_1 + L_2 \qquad (1)$$

As shown in FIG. 1, the relevant parameters are as follows:
R≡Range distance from the first aircraft to the target,
$L_1$≡Distance from the first aircraft to the ground bounce inflection point,
$L_2$≡Distance from the target to the ground bounce inflection point,
a≡Horizontal component of the distance from the first aircraft to the ground bounce inflection point,
b≡Horizontal component of the distance from the target to the ground bounce inflection point, θ≡The angle between the range trajectory (direction from the first aircraft to the target) and the horizon (the flat surface 14), and z≡Apex of an auxiliary triangle.

A right triangle 24 is defined by the first aircraft altitude H, vector 18, and the segment a. The triangle 24 is mirrored about the segment a axis such that an auxiliary triangle 28 is formed below the horizontal surface line 14. Point z is defined as the apex of triangle 28. Due to symmetry, the distance from the target to point z is L. The horizontal component of the distance from point z to the target is a+b and the vertical component of the distance from point z to the target is H+$H_T$. From these parameters, the total length L of the ground bounce signal path conforms to the following:

$$L^2 = (a+b)^2 + (H+H_T)^2 \quad (2)$$

By using some trigonometry equivalents for a+b, equation (2) can be converted to:

$$(a+b)^2 = \{R \cos \theta\}^2 = R^2\{1-\sin^2\theta\} = R^2 - (H_T - H)^2 \quad (3)$$

Inserting the result equation (3) into equation (2) leads to:

$$L^2 = R^2 - (H_T - H)^2 + (H+H_T)^2 \quad (4)$$

Solving for equation (4) for $H_T$ leads to the closed form solution of:

$$H_T = \frac{(L^2 - R^2)}{4H} \quad (5)$$

Distances such as R and L and sometimes H are determined by time delay. A normal radar will measure the time it takes for a signal to return after it has been sent. Since this total delay time represents a distance traveled of twice the range (R), the range can be found by using ½ of the total delay time. Distance and time are directly related by the speed the signal travels (which is very close to the speed of light). Multiplying the total delay time by the speed of light yields twice the range. This aspect is well-known and can be used to determine the range R in equation (5).

For the distance L, there will be additional signal returns having longer delays than the main return. A second return signal (after the radar range main signal) is produced by a signal traveling a path from the radar to the target, then back down to the ground bounce inflection point, and back to the radar. This delay encompasses a duration which includes the time for the signal to travel the range R plus the full path L. Similarly a third overlapping return occurs which also has the same delay and is a result of a path from the transmitter down to the ground bounce inflection point, then up to the target and directly back to the radar. Again this delay represents R+L. The second and third returns may not be distinguishable and may look like one single return since they overlap. Knowing L+R and also R from the radar output, a simple subtraction results in the length L.

A fourth signal return represents a path from the radar transmitter to the ground bounce inflection point and then to the target. From the target, the signal returns back down to the ground bounce inflection point and back to the radar. The delay for this signal return corresponds to a distance of 2*L.

Besides providing insight into how target height varies in relation to the input parameters, the flat model (i.e. equation (5) alone) provides a means for computing output errors that are very close to that of the spherical solution and for very long ranges on paper without having to create and run multiple simulations.

Output errors are computed differentially using equation (5). Using equation (5) directly, one can enter a scenario using nominal values for R, L and H to compute an $H_T$. Subsequent to this, one can then take into account what would happen if any one (or all) of the inputs (R, L and or H) had a certain amount of error associated with it by recalculating a second $H_T$ with the input offset error(s) applied. In the real world, R, L and H are not perfect and will have some known errors associated with them. The difference in the results for $H_T$ from the case where the inputs having no error, and for the case where the inputs having some certain amount of error, accurately predicts the target height error for a system using equation (5) alone. Predicting such errors is particularly important to development and can also be useful as an output (as it can indicate or provide to an end user the amount of uncertainty of the target height result). Equation (5) allows for simple, quick and accurate estimation of errors without requiring a great deal of time and effort to create and simulate other far more complex models on a computer which don't have a closed form solution. Output errors can also be computed using differential equations (6A), (6B), (7A) and (7B) below.

The flat model also provides a method for determining the output noise density function based on input noise densities, on paper without having to create and run simulations. This depends on the combination of how the inputs (L, R and H) are characterized from a probabilistic point of view, along with use of equation (5). The characterization of the inputs varies from system to system. A person performing a system analysis would first need to know the particular system's probabilistic characteristics of L, R and H, which would then be used as inputs to the height finding process (via equation (5)), along with use of a combination of probability and calculus to yield the resultant output noise (density) characteristics. Because equation (5) is a closed form solution, such calculations are able to be done on paper.

To do an analysis, one would set all the input variances (of L, H and R) to zero and use the input mean values to calculate an initial $H_T$ using equation (5). Then using probability and calculus with equation (5), the actual output mean, variance and statistical shape (noise density) is then derived. The difference from the mean output of $H_T$ and the $H_T$ output when the input variance was set to zero, will be the expected output offset error. The output variance and statistical shape (noise density) derived using probability and equation (5) is the rest of the desired statistical noise output characteristic.

Since the differential errors of the flat model are very similar to the differential errors of the spherical solution, the flat model solution can be used as a tool to perform such error estimates with very good results over very long ranges as well. The flat model also provides a means for understanding the basic relationship of how inputs affect the output, and serves as the basis for developing a very fast converging spherical height finding model.

Differential error is one of the most important parameters used to study the behavior of any system and its performance. It reflects how much the output can change if any of the inputs had a small error (change) associated with it. In real life, nothing is exact and accuracy is key to performance. It is important to know how much $H_T$ changes for a known input error change. The difference between nominal and nominal plus a small error is called the differential error (both at the input and at the output) and is an important parameter to understand and to maintain accuracy.

The flat model (i.e. equation (5)) allows easy and accurate approximation and assessment of the sensitivity of the output to the inputs (very close to the spherical model solution) on paper, without having to create and run multiple simulations. Taking a partial derivative of $H_T$ with respect to the input variables results in the following:

$$\delta H_T = \left[\frac{L}{2H}\right]\delta L - \left[\frac{L^2 - R^2}{4H^2}\right]\delta H - \left[\frac{R}{2H}\right]\delta R \tag{6A}$$

and normalizing by $H_T$ results in the following:

$$\frac{\delta H_T}{H_T} = \left[\frac{2L}{(L^2 - R^2)}\right]\delta L - \left[\frac{1}{H}\right]\delta H - \left[\frac{2R}{(L^2 - R^2)}\right]\delta R \tag{6B}$$

These differential equations allow one to gain insight to the sensitivity of $H_T$ to its inputs on both a direct and a percent basis. The sensitivity factors for L, H and R, which may be computed and compared, are as follows in respective order:

$$\frac{L}{2H}, \quad \frac{(L^2 - R^2)}{4H^2}, \quad \text{and} \quad \frac{R}{2H} \tag{7A}$$

The sensitivity factor is a factor which relates a change of an input to the amount of change the output would have for a given nominal set of inputs (which is useful for analysis and assessment).

Sensitivity factors as a percent of HT in respective order are as follows:

$$\frac{100 * 2L}{(L^2 - R^2)}, \quad \frac{-100}{H}, \quad \text{and} \quad \frac{100 * 2R}{(L^2 - R^2)} \tag{7B}$$

These factors depict one aspect of the power and worth of having an exact closed form solution. Note that by inspection, $H_T$ is more sensitive to L errors than R errors by the factor of L/R. $H_T$ is also very sensitive for cases of low aircraft altitude (small H). On a percent basis, when L is very close to R (for example, for a low target altitude) the output error as a percent increases.

The position of the ground bounce inflection point, which is the segment a length, can also be calculated. Using equation (3), the segment b length needs to be eliminated from the left hand side. Using symmetry, b can be expressed as follows:

$$b = a\left(\frac{H_T}{H}\right) \tag{8}$$

Substituting this into equation (3) and solving for a leads to:

$$a = \frac{\sqrt{R^2 - (H_T - H)^2}}{\left(1 + \frac{H_T}{H}\right)} \tag{9}$$

The flat model has many advantages in airborne radar, and may also be used directly for cases where range versus tolerable error is within acceptable limits. For example, for ranges on the order of 65 miles or less, the height calculated from equation (5) has an absolute accuracy of about 0.5 miles, which is useful in itself. Absolute accuracy degrades with increasing range. However on a differential error basis (using equation (5) directly with and without input errors or equations (6) and (7)) equation (5) yields significantly more accuracy for even much larger ranges, and it can serve as a useful tool to estimate input offset errors and errors due to noise with results that are similar to a spherical model.

Figure 2:
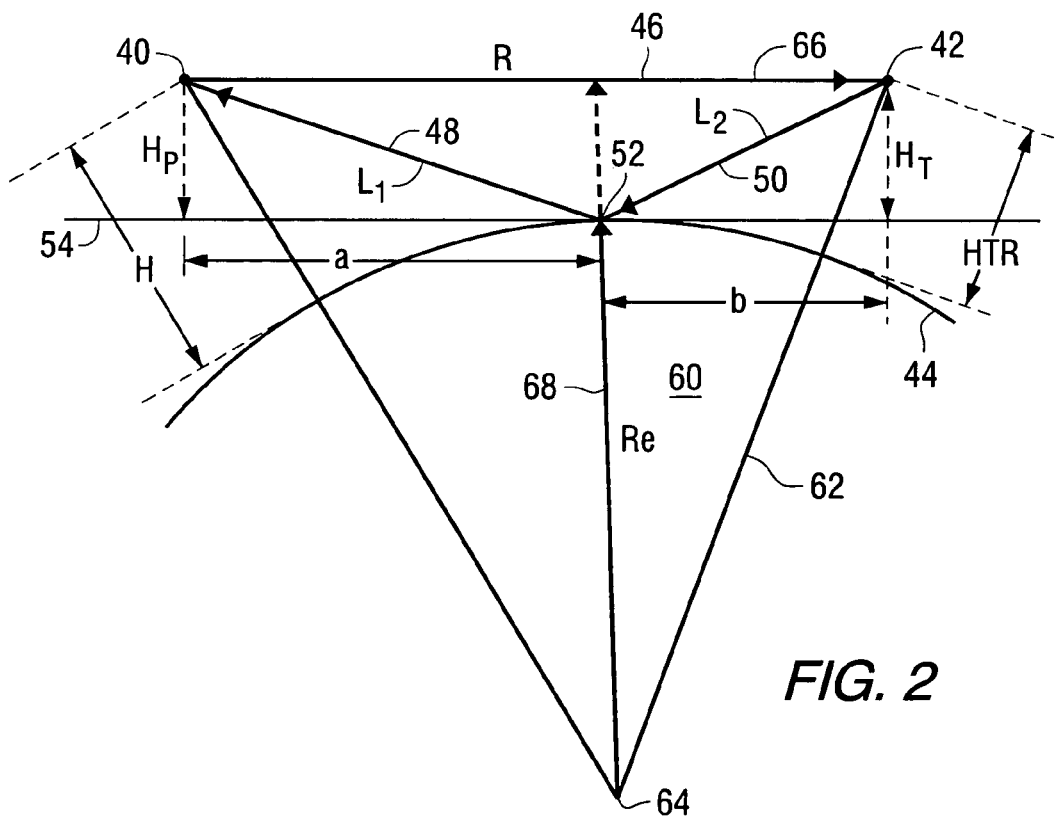
FIG. 2 is a diagram of another aircraft and target system that illustrates the method of the invention.

A second embodiment of the invention uses the spherical model. FIG. 2 is a diagram of a spherical earth height finding geometry. In FIG. 2, a first aircraft is located at point 40. A target, which can be a second aircraft is located at point 42. The method seeks to determine the height HTR of the target above a spherical surface 44. Vector 46 has a magnitude R, which represents the distance (range) from point 40 to point 42. In a practical implementation of the invention, this distance could be determined using a radar in the first aircraft. Vectors 48 and 50 represent the path of a multipath signal, which may be a radar return signal from the target. Vectors 48 and 50 have lengths $L_1$ and $L_2$. Point 52 is the ground bounce inflection point of the multipath signal.

H is the height of the first aircraft above the spherical surface. Line 54 is a tangent to the spherical surface at the ground bounce inflection point and the FIG. 2 depiction is oriented such that line 54 is also horizontal for ease of discussion. $H_P$ is the height of the first aircraft above and perpendicular to line 54. $H_T$ is the height of the target above and perpendicular to line 54. The horizontal component of vector 48 is a. The horizontal component of vector 50 is b. Re is the radius of the sphere, which in this example is the radius of the earth.

The development of the spherical solution utilizes the flat solution to relate $H_T$ as a function of $H_P$. Relations between $H_P$ and H, and $H_T$ and HTR are also developed. First consider the relationship between $H_T$ and HTR. A right triangle 60 can be formed such that the hypotenuse is a segment 62 (Re+HTR) which extends from the origin 64 to the target. A line segment of length b forms a first leg 66. The distance (Re+$H_T$) starting from the origin and extending past and perpendicular to line 54 (at the ground bounce point 52) forms the second leg 68. The lengths of these legs are then related as follows:

$$(Re+H_T)^2 + b^2 = (Re+HTR)^2 \tag{10}$$

Where: Re≡Radius of the Earth, $H_T$≡Shortest distance from target to the line 54 (and also is perpendicular to line 54), and HTR≡Radial Target Height. As discussed in the flat model, and from symmetry, $$b = a\frac{H_T}{H_P}.$$

Solving for HTR gives:

$$HTR = -Re + \sqrt{(Re + H_T)^2 + a^2\left[\frac{H_T}{H_P}\right]^2} \quad (11)$$

To compute $H_T$, an iterative feedback loop can be used. This feedback loop can be implemented as follows. First $H_T$ is estimated using the flat solution in equation (5) with an initial condition of $H_P=H$ (and also using the corresponding variables in FIG. 2). Next an estimate of segment a is made using equation (9) (and also using the corresponding variables depicted in FIG. 2). Then from these results, a new $H_P$ is computed based on H and a (in a manner similar to the relating of HTR to $H_T$) by solving for $H_P$ in the following:

$$(Re+H_P)^2+a^2=(Re+H)^2 \quad (12)$$

Figure 3:
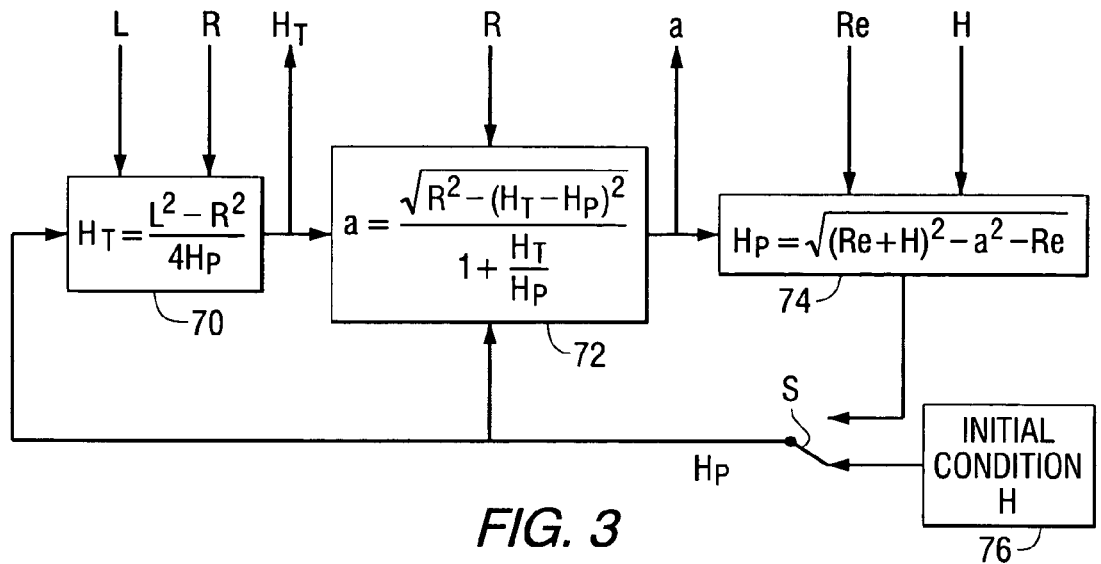
FIG. 3 is a block diagram of a height finding iterative loop.

The feedback loop model, which relates H to $H_P$ and also computes a and $H_T$, is illustrated in FIG. 3. In the model of FIG. 3, switch S would initially be switched to input parameter H as an initial condition as illustrated by block 76. $H_T$ is estimated as shown in block 70. Then a is estimated as shown in block 72 by the application of equation (9) to FIG. 2 (upon replacing H by $H_P$). Next, $H_P$ is estimated as shown in block 74 by using equation (12) solved for $H_P$. The position of switch S would then be changed so that the estimated $H_P$ is used as an input to blocks 70 and 72 for iterations of 2 or more. The calculation in blocks 70, 72 and 74 can be repeated until an acceptable estimate for $H_P$ is obtained (i.e an acceptably small change in $H_P$ occurs from one iteration to the next). A single calculation after iterating the loop, using equation (11), results in the final target height, HTR.

The spherical solution is an iterative approach, which was derived by an extension of the flat solution. Because it uses feedback, it converges very rapidly (e.g. 2 iterations for a 0.1 nautical mile result error and 5 iterations for a 0.001 nautical mile result error). Because so few iterations are required, the spherical earth calculation may also be computed with pen and paper with a little effort. The spherical calculations derived here can also be coded up quickly and easily, for use in a computer program that determines the position of the ground bounce inflection point.

In the past, an atmospheric bending correction has been taken into account either as a post correction process or by an offset of the earth radius in the spherical calculation by a certain amount. The derivations and solutions provided here do not address atmospheric bending, but a user can correct for this effect using known techniques.

Several cases have been examined to compare the differential error accuracy of the flat solution to that of the spherical solution. The results are depicted in Table 1. These results demonstrate that the flat model can be used to estimate errors in the target height due to input errors. The resulting errors are very close to that of the spherical model. In Table 1, numbers in bold italics depict where the error was induced.

TABLE 1

Differential Error Comparison (Flat vs. Spherical)

| Range | Height | Bounce Distance | Spherical Target Height | Spherical Error | Flat Error |
|---|---|---|---|---|---|
| Case 1 | | | | | |
| 250 | 1 | 251 | 131.5149 | N/A | N/A |
| *249.9958* | 1 | 251 | 132.0215 | 0.49 | 0.52 |
| 250 | *1.004* | 251 | 131.0156 | 0.5 | 0.5 |
| 250 | 1 | *249.9958* | 131.0059 | 0.51 | 0.53 |
| Case 2 | | | | | |
| 0.5 | 0.5 | 1.25 | 0.65625 | N/A | N/A |
| *0.55* | 0.5 | 1.25 | 0.630127 | 0.026 | 0.025 |
| 0.5 | *0.55* | 1.25 | 0.59644 | 0.06 | 0.066 |
| 0.5 | 0.5 | *1.3125* | 0.73633 | 0.08 | 0.078 |

Noise is also a source of error and because the flat model closely matches the spherical situation in terms of differential error, output noise density as a function of input noise densities can be computed/estimated on paper with use of the flat solution in equation (5).

As a simple example, if the ground bounce distance estimate were the dominant input noise source and it was uniformly distributed, the noise density of the target height output would be close to a triangular shape due to the $L^2$ term in equation (5). Other input noise densities or combinations of input noise densities with mean and variance can be applied and the output noise density can be closely estimated on paper. The noise-induced error on the output can be assessed by applying input mean values directly to equation (5) with no noise and comparing this result to the computed output noise density mean value result.

From the above description, it should now be apparent that the invention provides a method for determining the height $H_T$ of a target above a surface. For the flat model, the method comprises the steps of determining a distance R from a source to a target, determining a distance L representative of a distance traveled by a signal from the target that is reflected by the surface to the source, determining a height H of the source above the surface, and determining the height $H_T$ of the target and height errors (due to input errors) using the equation:

$$H_T = \frac{(L^2 - R^2)}{4H}$$

For the spherical model, the method further comprises the steps of:

(a) determining a parameter a using the formula $$a = \frac{\sqrt{R^2 - (H_T - H_P)^2}}{1 + \frac{H_T}{H_P}},$$

wherein $H_P$ is initially set equal to H;

(b) updating the parameter $H_P$ using the formula $$H_P = \sqrt{(Re+H)^2 - a^2} - Re$$

wherein Re is the radius of a sphere;
 (c) repeating step (a) using the updated parameter $H_P$;
 (d) repeating step (b); and
 (e) determining a height of the target using the formula $$HTR = -Re + \sqrt{(Re + H_T)^2 + a^2\left[\frac{H_T}{H_P}\right]^2}.$$

Steps (a) and (b) can be repeated until the parameter $H_P$ is determined with a desired accuracy.

Figure 4:
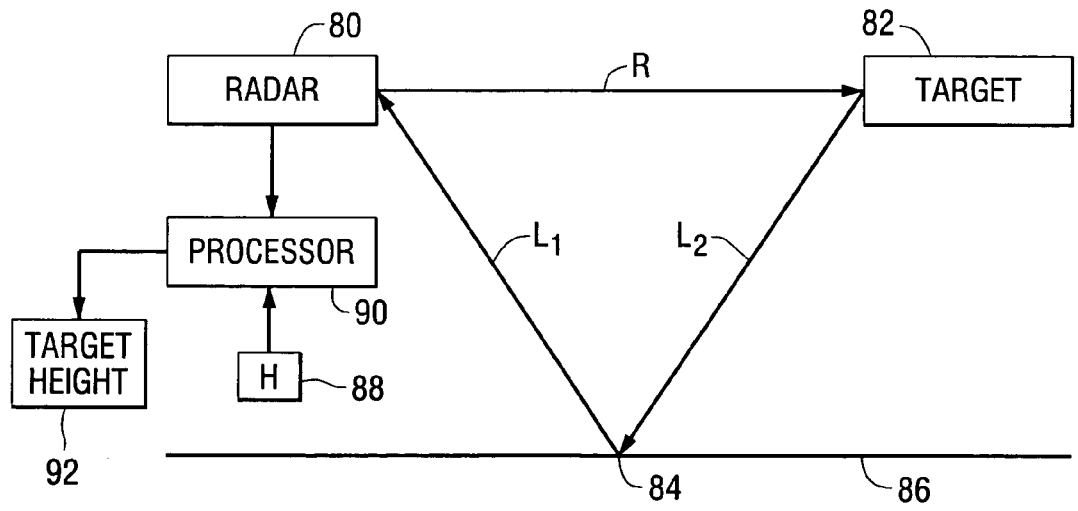
FIG. 4 is a block diagram of an apparatus that can perform the method of the invention.

FIG. 4 is a block diagram of an apparatus that can perform the method of the invention. A radar 80 can be mounted on an aircraft and a target 82 can be another aircraft. The distance R from the radar to the target can be determined using well-known technology. The distance $L=L_1+L_2$ is the distance traveled by a multipath signal, which can be a radar signal reflected by the target toward the ground bounce point 84 on the earth 86, and subsequently reflected by the earth to the radar. An altimeter 88 in the first aircraft can determine the height H. A processor 90 receives values for the parameters H, R and L and computes the target height using the methods and equations described above. The target height is then displayed or otherwise delivered as an output as shown by block 92.

While the invention has been described in terms of several embodiments, it will be apparent to those skilled in the art that various changes can be made to the described embodiments without departing from the scope of the invention as set forth in the following claims.

What is claimed is:

1. A method for determining the height $H_T$ of a target above a surface, the method comprising the steps of:
 (a) determining a distance R from a source to a target;
 (b) determining a distance L representative of a distance traveled by a signal from the target that is reflected by the surface to the source;
 (c) determining a height H of the source above the surface;
 (d) determining the height $H_T$ of the target using the equation:

$$H_T = \frac{(L^2 - R^2)}{4H};$$

(e) determining a parameter a using the formula $$a = \frac{\sqrt{R^2 - (H_T - H_P)^2}}{1 + \frac{H_T}{H_P}},$$

wherein $H_P$ is initially set equal to H;
 (f) updating the parameter $H_P$ using the formula $$H_P = \sqrt{(Re+H)^2 - a^2} - Re,$$

wherein Re is the radius of a sphere:
 (g) repeating step (e) using the updated parameter $H_P$;
 (h) repeating step (f);
 (i) determining a height of the target using the formula $$HTR = -Re + \sqrt{(Re + H_T)^2 + a^2\left[\frac{H_T}{H_P}\right]^2};$$

and
 outputting the height HTR.

2. The method of claim 1, wherein the step of determining a distance R from a source to a target comprises the step of:
 determining a range from a radar at the source to the target.

3. The method of claim 1, wherein the step of determining a distance L representative of a distance traveled by a signal from the target that is reflected by the surface to the source comprises the step of:
 using a delay of a radar return for a signal to determine L+R, and subtracting R.

4. The method of claim 1, wherein the step of determining a distance L representative of a distance traveled by a signal from the target that is reflected by the surface to the source comprises the step of:
 using a delay of a radar return for a signal to determine 2L, and dividing by 2.

5. The method of claim 1, wherein the step of determining a distance L representative of a distance traveled by a signal from the target that is reflected by the surface to the source comprises the step of:
 using the delay of radar returns for signals that determine both R and L+R and subtracting the two.

6. The method of claim 1, wherein the step of determining a height H of the source above the surface comprises the step of:
 using an altimeter in an aircraft to determine H.

7. The method of claim 1, wherein steps (e) and (f) are repeated until the parameter $H_P$ is determined with a desired accuracy.

8. The method of claim 1, further comprising the step of:
 estimating errors due to changes in input parameters.

9. An apparatus, comprising:
 a radar transmitter located at an altitude H above a reflecting surface, for emitting radiation;
 a radar receiver for detecting radiation reflected from a target located at an altitude $H_T$ above the reflecting surface; and
 a processor for calculating the target altitude $H_T$ from the relationship $$H_T = \frac{(L^2 - R^2)}{4H};$$

wherein L is a path length of the radiation reflected from the target and the reflecting surface to the antenna, and R is a range between the radar antenna and the target; and
wherein the processor:
 determines a parameter a using the formula $$a = \frac{\sqrt{R^2 - (H_T - H_P)^2}}{1 + \frac{H_T}{H_P}},$$

wherein $H_P$ is initially set equal to H;

updates the parameter $H_P$ using the formula $$H_P = \sqrt{(Re+H)^2 - a^2} - Re,$$

wherein Re is the radius of a sphere;

repeats the step of determining the parameter a using the updated parameter $H_P$;

repeats the step of updating the parameter $H_P$; and determines a height of the target using the formula $$HTR = -Re + \sqrt{(Re + H_T)^2 + a^2 \left[\frac{H_T}{H_P}\right]^2}.$$

* * * * *